(12) United States Patent
Terada et al.

(10) Patent No.: US 8,889,796 B2
(45) Date of Patent: Nov. 18, 2014

(54) PERFLUOROELASTOMER COMPOSITION

(75) Inventors: Junpei Terada, Settsu (JP); Tatsuya Morikawa, Settsu (JP); Daisuke Ota, Settsu (JP); Meiten Koh, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 105 days.

(21) Appl. No.: 13/125,490

(22) PCT Filed: Oct. 2, 2009

(86) PCT No.: PCT/JP2009/067588
§ 371 (c)(1),
(2), (4) Date: Apr. 21, 2011

(87) PCT Pub. No.: WO2010/047234
PCT Pub. Date: Apr. 29, 2010

(65) Prior Publication Data
US 2011/0207890 A1   Aug. 25, 2011

Related U.S. Application Data

(60) Provisional application No. 61/107,636, filed on Oct. 22, 2008.

(51) Int. Cl.
*C08L 27/18* (2006.01)

(52) U.S. Cl.
USPC ......... 525/326.3; 524/544; 526/247; 526/242

(58) Field of Classification Search
USPC ................ 525/326.3; 524/544; 526/247, 242
See application file for complete search history.

(56) References Cited

U.S. PATENT DOCUMENTS

| | | | |
|---|---|---|---|
| 4,508,603 A | 4/1985 | Ukihashi et al. | |
| 4,513,128 A | 4/1985 | Uschold | |
| 4,766,190 A | 8/1988 | Morita et al. | |
| 5,677,389 A | 10/1997 | Logothetis et al. | |
| 6,642,307 B1 | 11/2003 | Sogabe et al. | |
| 6,878,778 B1 | 4/2005 | Kawasaki et al. | |
| 8,367,776 B2 * | 2/2013 | Noguchi et al. | 525/200 |
| 2005/0020748 A1 | 1/2005 | Morikawa et al. | |
| 2006/0135716 A1 | 6/2006 | Hung et al. | |
| 2008/0287627 A1 * | 11/2008 | Noguchi et al. | 526/247 |
| 2011/0086229 A1 * | 4/2011 | Noguchi et al. | 428/421 |

FOREIGN PATENT DOCUMENTS

| | | | |
|---|---|---|---|
| EP | 1464671 A1 * | 10/2004 | |
| FR | 2333824 A1 | 7/1977 | |
| GB | 1 518 387 | 7/1978 | |
| JP | 61-223007 A | 10/1986 | |
| JP | 62-089713 A | 4/1987 | |
| JP | 09-291122 A | 11/1997 | |
| JP | 10-237130 A | 9/1998 | |
| JP | 2001-354719 A | 12/2001 | |
| JP | 2002-507640 A | 3/2002 | |
| JP | 2003-137930 A | 5/2003 | |
| JP | 2003-526705 A | 9/2003 | |
| JP | 2004-527596 A | 9/2004 | |
| JP | 2008-524394 A | 7/2008 | |
| WO | 00/22002 A1 | 4/2000 | |
| WO | 01/32773 A1 | 5/2001 | |
| WO | 02/060968 A1 | 8/2002 | |
| WO | WO-02/060968 A1 * | 8/2002 | |
| WO | 03/051987 A1 | 6/2003 | |
| WO | 2006/068685 A1 | 6/2006 | |
| WO | 2006/068735 A1 | 6/2006 | |
| WO | 2008/041557 A1 | 4/2008 | |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

There is provided a perfluoroelastomer composition having a low glass transition temperature and excellent cold resistance and heat resistance and comprising a perfluoroelastomer comprising a tetrafluoroethylene unit (a), a perfluoro vinyl ether unit (b) and a cure site unit (c) having nitrile group, carboxyl group and/or alkoxycarbonyl group as a cure site, wherein the perfluoro vinyl ether unit (b) is contained in an amount of 8 to 23% by mole in the perfluoroelastomer.

11 Claims, No Drawings

PERFLUOROELASTOMER COMPOSITION

CROSS-REFERENCE TO RELATED APPLICATION

This application claims benefit under 35 U.S.C. §119(e) of U.S. Provisional Application No. 61/107,636 filed on Oct. 22, 2008, incorporated herein by reference in its entirety.

TECHNICAL FIELD

The present invention relates to a fluorine-containing elastomer composition having heat resistance and cold resistance.

BACKGROUND ART

Fluorine-containing elastomers, particularly perfluoroelastomers mainly comprising a tetrafluoroethylene (TFE) unit are widely used as sealing materials, etc. to be used under harsh environment because excellent chemical resistance, solvent resistance and heat resistance are exhibited.

However, with advances in technologies, more rigorous demand for characteristics have been imposed, and in the fields of aviation and space industries, semiconductor manufacturing equipment and chemical plant, sealing property in vacuo, plasma resistance and heat resistance are demanded.

To cope with such a demand, perfluoroelastomer copolymers comprising TFE unit, perfluoro(methyl vinyl ether) (PMVE) unit and cyano group-containing monomer unit are used, but these copolymers have a high glass transition temperature Tg, is fragile at low temperature and have a problem with cold resistance.

Also, to cope with such a demand, there are used vinyl ethers having a long side chain in addition to vinyl ethers having a short side chain such as PMVE.

For example, in JP61-223007A and JP62-89713A, there are disclosed fluoroelastomers comprising a TFE unit and a monomer unit comprising $CF_2=CFO(CF_2CFXO)_mRf$ (X is a fluorine atom or a trifluoromethyl group; "m" is an integer of 1 to 5; Rf is a perfluoroalkyl group having 1 to 6 carbon atoms). However, since the fluoroelastomers comprise an iodine-containing monomer unit to impart crosslinkability, there is a problem that heat resistance of a crosslinked structure is low and heat resistance of a molded article is not good.

In WO 00/22002, there is disclosed a fluorine-containing polymer comprising a TFE unit and a monomer unit comprising $CF_2=CFORf$ (Rf is a perfluoroalkyl group having 1 to 5 carbon atoms or a perfluoroalkyl (poly)vinyl ether having 1 to 3 oxygen atoms and 3 to carbon atoms). However, since the polymer comprises an iodine-containing monomer unit to impart crosslinkability, there is room for improvement in that heat resistance of a crosslinked structure is low and heat resistance of a molded article is not good.

In JP9-291122A, there is disclosed a fluorine-containing copolymer elastomer comprising a TFE unit, perfluoro(vinyl ether) represented by $CF_2=CFO(CF_2)_2(OCF_2)_nOCF_3$ ("n" is an integer of 1 to 5) and a bromine-containing unsaturated monomer compound. The fluorine-containing copolymer elastomer has bromine atoms as a crosslinkable group, and has a problem that heat resistance of a crosslinked structure thereof is low and heat resistance of a molded article is not good.

In JP2001-354719A and JP2003-137930A, there are disclosed fluoroelastomers comprising a TFE unit and $CF_2=CFOCF_2OR$ (R is a linear or branched C2 to C6 perfluoroalkyl group, a cyclic C5 to C6 perfluoroalkyl group or a linear or branched C2 to C6 perfluorooxyalkyl group having 1 to 3 oxygen atoms). JP2001-354719A and JP2003-137930A describe that it is preferable to have, as a cure site, iodine atom and/or bromine atom in a polymer chain and/or at an end of a polymer chain. However, in the case of having, as a cure site, iodine atom and/or bromine atom, there is a problem that heat resistance of a crosslinked structure is low and heat resistance of a molded article is not good.

In WO 2006/068685, there are disclosed fluoro polymers comprising a TFE unit and a monomer unit comprising $CF_2=CFORf^2$ ($Rf^2$ is a perhaloalkyl group or a perhaloalkoxyalkyl group), and examples of the $CF_2=CFORf^2$ disclosed therein are $CF_2=CFOCF_3$, $CF_2=CFOCF_2OCF_2CF_2CF_3$, $CF_2=CFOCF_2OCF_2CF_3$, $CF_2=CFOCF_2OCF_3$, $CF_2=CFO(CF_2)_3OCF_3$, and $CF_2=CFOCF_2CF_2OCF_3$. The cure site of the fluoro polymers is amidoxime or amidrazone, and these cure sites have a problem in that a step of modifying a polymer is complicated.

In JP2002-507640A, there is disclosed a perfluoroelastomer comprising TFE as perfluoro olefin, perfluoroalkoxy vinyl ether and a cure site component having halogen group being capable of participating in peroxide crosslinking reaction. In the perfluoroelastomer, the cure site is formed by imparting halogen atom, and such a cure site has a problem that heat resistance of a crosslinked structure is low and heat resistance of a molded article is not good.

With respect to an elastomer composition comprising a monomer unit having nitrile group as a cure site, for example, JP10-237130A discloses a copolymer comprising, as a monomer, fluorine-containing nitrile compound represented by $CH_2=CFCF_2O-(CF_2O)_x-(CF_2CF_2O)_y-(CF_2CF_2O)_z-(CF(CF_3)CF_2O)_w-CF_2CN$ ("x", "y", "z" and "w" independently represent 0 or an integer of 1 to 20, and the sum of "x", "y", "z" and "w" does not exceed 20). Since the fluorine-containing nitrile compound is not a perfluoro monomer but a fluoro monomer, there is a problem that polymerizability is not good and sufficient heat resistance cannot be obtained.

In WO 2006/068735, a monomer unit having nitrile group as a cure site is described. However, perfluoro vinyl ether is an allyl ether type perfluoro vinyl ether such as $CF_2=CF-CF(Z)-O-Rf$, and when such a perfluoro allyl ether is used as a monomer unit, there is a problem that polymerizability is not good.

In JP2003-526705A, there is disclosed a fluoroelastomer comprising perfluoroolefin, perfluoro(alkoxy vinyl)ether and a copolymer unit derived from a cure site component being capable of participating in peroxide curing reaction, and TFE is disclosed as an example of perfluoroolefin, and $CF_2=CFOCF_2OCF_2CF_2CF_3$, $CF_2=CFOCF_2CF_3$, $CF_2=CFO(CF_2)_3OCF_3$, and $CF_2=CFOCF_2CF_2OCF_3$ are disclosed as examples of perfluoro(alkoxy vinyl)ether. Examples of the cure site component disclosed therein are iodine- or bromine-containing unsaturated monoolefin, $CF_2=CFO(CF_2)_nCN$, $CF_2=CFO[CF_2CFCF_3O]_pCF_2CF(CF_3)_mCN$ and $CF_2=CF[OCF_2CFCF_3]_xO(CF_2)_mCN$. Curing reaction of this fluoroelastomer is peroxide curing reaction, and there is a problem that heat resistance of a crosslinked structure is low and heat resistance of a molded article is low.

In WO 2003/051987, there is disclosed a fluorine-containing elastomer comprising TFE as perfluoroolefin and $CF_2=CFORf$ (Rf is a perfluoroalkyl group having 1 to 8 carbon atoms or a fluoropolyoxyalkyl group having 1 to 20 carbon atoms) as perfluoro vinyl ether and having carboxyl group, alkoxycarbonyl group or nitrile group as a crosslinkable group. However, the fluorine-containing elastomer actually used is one having a perfluoro(methyl vinyl ether) unit, and there is room for improvement in cold resistance.

DISCLOSURE OF INVENTION

It is an object of the present invention to provide a perfluoroelastomer composition comprising a perfluoroelastomer having a low glass transition temperature and excellent cold resistance and heat resistance.

The present invention relates to a perfluoroelastomer composition comprising a perfluoroelastomer comprising:
(a) a tetrafluoroethylene unit,
(b) a perfluoro vinyl ether unit represented by the formula (I):

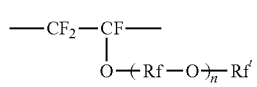

wherein Rf is a linear or branched perfluoroalkylene group having 1 to 6 carbon atoms; "n" is an integer of 1 to 20, and when "n" is 2 or more, Rfs in "n" (RfO) units may be the same or different; Rf' is a linear or branched perfluoroalkyl group having 1 to 6 carbon atoms, and
(c) a cure site unit having a nitrile group, a carboxyl group and/or an alkoxycarbonyl group as a cure site,
and the perfluoro vinyl ether unit (b) is contained in an amount of 8 to 23% by mole in the perfluoroelastomer.

It is preferable that the perfluoro vinyl ether unit (b) is a unit represented by the formula (bI):

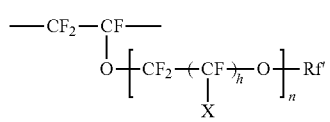

wherein X is fluorine atom or a trifluoromethyl group, and when X is fluorine atom, "h" is 0 or an integer of 1 to 5, and when X is a trifluoromethyl group, "h" is 0 or an integer of 1 to 2; "n" is an integer of 1 to 20, and when "n" is 2 or more, $(CF_2(CFX)_h)$ in "n" $(CF_2(CFX)_h\cup)$ units may be the same or different; Rf' is a linear or branched perfluoroalkyl group having 1 to 6 carbon atoms.

It is preferable that the concentration of cure sites per unit mass of the whole perfluoroelastomer is $1.0\times10^{-6}$ to $1.0\times10^{-3}$ mole/g.

It is preferable that the glass transition temperature of the perfluoroelastomer is $-70°$ C. to $-10°$ C.

It is preferable that the Mooney viscosity at 121° C. of the perfluoroelastomer is not less than 50.

It is preferable that the temperature of the perfluoroelastomer measured with a thermogravimetric/differential thermal analyzer (TG/DTA) at 20% mass reduction is not less than 430° C.

It is preferable that the temperature of the perfluoroelastomer measured with a thermogravimetric/differential thermal analyzer (TG/DTA) at 50% mass reduction is not less than 450° C.

It is preferable that the above-mentioned perfluoroelastomer has carboxyl group and satisfies the following equation (1).

$$(S_{CO}/S_{CF}) \geq 0.01 \quad (1)$$

$S_{CO}$: Total area of absorbances at the absorptions derived from carbonyl group of associated and non-associated carboxyl groups having the absorption peaks at from 1,700 to 1,830 cm$^{-1}$ when measurement is made with FT-IR with respect to the elastomer to be measured.

$S_{CF}$: Area of absorbance at absorption derived from a harmonic sound of C—F bond having an absorption peak at from 2,213 to 2,686 cm$^{-1}$ when measurement is made with FT-IR with respect to the elastomer to be measured. In the case where nitrile group is present, $S_{CF}$ is a value obtained by subtracting an area of absorbance at absorption derived from nitrile group having an absorption peak at from 2,248 to 2,282 cm$^{-1}$ from a total area of absorbance at whole absorption having a peak at from 2,213 to 2,686 cm$^{-1}$.

It is preferable that the above-mentioned perfluoroelastomer composition is a perfluoroelastomer composition comprising a crosslinking agent.

It is preferable that the crosslinking agent is a compound having at least two crosslinkable reaction groups represented by the formula (II):

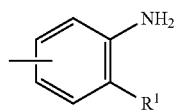

wherein $R^1$s are the same or different and each is any one of —$NH_2$, —$NHR^2$ ($R^2$ is a fluorine atom or a monovalent organic group, and when two or more —$NHR^2$ are contained, $R^2$s may be the same or different), —OH or —SH.

It is preferable that the crosslinking agent is a compound represented by the formula (III):

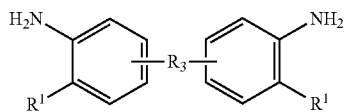

wherein $R^1$ is as defined in the above formula (II); $R^3$ is —$SO_2$—, —O—, —CO—, an alkylene group having 1 to 6 carbon atoms, perfluoroalkylene group having 1 to 10 carbon atoms, a single bond or a group represented by:

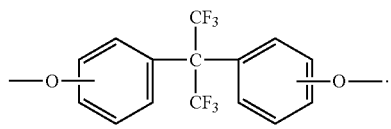

It is preferable that the crosslinking agent is a compound having at least two crosslinkable reaction groups represented by the formula (IV):

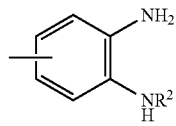

wherein $R^2$s in two or more —$NHR^2$ may be the same or different and each is a fluorine atom or a monovalent organic group.

It is preferable that the crosslinking agent is a compound represented by the formula (V):

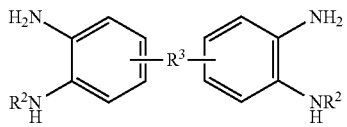

wherein $R^2$ is as defined in the above formula (IV); $R^3$ is —$SO_2$—, —O—, —CO—, an alkylene group having 1 to 6 carbon atoms, a perfluoroalkylene group having 1 to 10 carbon atoms, a single bond or a group represented by:

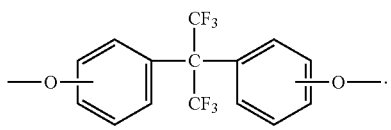

BEST MODE FOR CARRYING OUT THE INVENTION

The perfluoroelastomer composition of the present invention comprises the perfluoroelastomer comprising:

(a) the tetrafluoroethylene (hereinafter also referred to as TFE) unit, (b) the perfluoro vinyl ether unit represented by the formula (I):

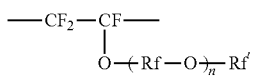

wherein Rf is a linear or branched perfluoroalkylene group having 1 to 6 carbon atoms; "n" is an integer of 1 to 20, and when "n" is 2 or more, Rfs in "n" (RfO) units may be the same or different; Rf' is a linear or branched perfluoroalkyl group having 1 to 6 carbon atoms, and (c) the cure site unit having a nitrile group, a carboxyl group and/or an alkoxycarbonyl group as a cure site.

The content of TFE unit (a) in the perfluoroelastomer is preferably not less than 77% by mole, more preferably not less than 79% by mole, further preferably not less than 80% by mole, from the viewpoint of satisfactory heat resistance. In addition, the content of TFE unit (a) is preferably not more than 92% by mole, more preferably not more than 90% by mole, further preferably not more than 87% by mole, from the viewpoint that properties of the perfluoroelastomer do not become akin to those of a resin, properties of an elastic rubber are not lost and cold resistance is not lost.

The perfluoro vinyl ether unit (b) in the perfluoroelastomer is the perfluoro vinyl ether unit (b) represented by the formula (I):

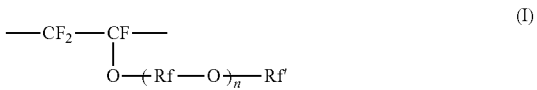

wherein Rf is a linear or branched perfluoroalkylene group having 1 to 6 carbon atoms, preferably 1 to 4 carbon atoms, more preferably 1 to 3 carbon atoms; "n" is an integer of 1 to 20, preferably 1 to 10, more preferably 1 to 5 and when "n" is 2 or more, Rfs in "n" (RfO) units may be the same or different; Rf' is a linear or branched perfluoroalkyl group having 1 to 6 carbon atoms, preferably 1 to 5 carbon atoms, more preferably 1 to 3 carbon atoms.

It is preferable that the perfluoro vinyl ether unit (b) is the perfluoro vinyl ether unit (b) represented by the formula (bI):

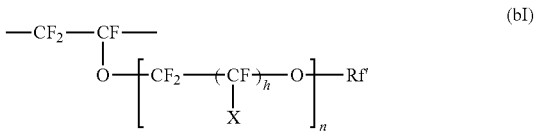

wherein X is fluorine atom or a trifluoromethyl group, and when X is fluorine atom, "h" is 0 or an integer of 1 to 5, preferably 0 or an integer of 1 to 3, more preferably 0 or an integer of 1 to 2 and when X is a trifluoromethyl group, "h" is 0 or an integer of 1 to 2, more preferably 0 or 1; "n" is an integer of 1 to 20, preferably an integer of 1 to 10, more preferably an integer of 1 to 5 and when "n" is 2 or more, $(CF_2(CFX)_h)$ in "n" $(CF_2(CFX)_hO)$ units may be the same or different; Rf' is as defined in the above-mentioned formula (I).

Examples of the perfluoro vinyl ether unit (b) are those represented by the formulas:

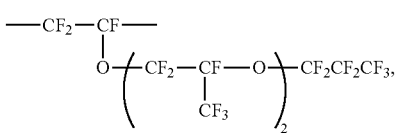
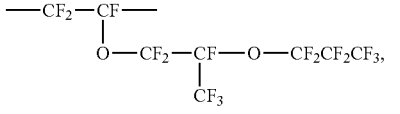
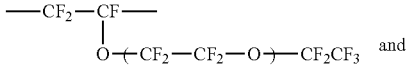
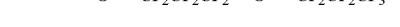

and among these, from the viewpoint of easy synthesis,

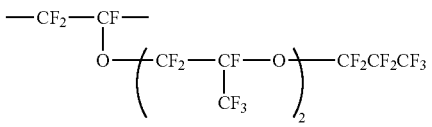

is preferred.

The content of perfluoro vinyl ether unit (b) is not less than 8% by mole, preferably not less than 10% by mole, more preferably not less than 13% by mole, from the viewpoint that properties of the perfluoroelastomer do not become akin to those of a resin, properties of an elastic rubber are not lost and cold resistance is not lost. In addition, the content of perfluoro vinyl ether unit (b) is not more than 23% by mole, preferably not more than 22% by mole, more preferably not more than 21% by mole, from the viewpoint of satisfactory compression set at high temperature.

The cure site unit (c) in the perfluoroelastomer has a nitrile group, a carboxyl group and/or an alkoxycarbonyl group as a cure site.

This nitrile group, carboxyl group or alkoxycarbonyl group can act as a cure site. From the viewpoint of excellent crosslinking reactivity, a cure site of the cure site unit (c) is preferably a nitrile group.

The concentration of cure sites per unit mass of the whole perfluoroelastomer is preferably not less than $1.0 \times 10^{-6}$ mole/g, more preferably not less than $1.0 \times 10^{-5}$ mole/g, further preferably not less than $2.0 \times 10^{-5}$ mole/g, from the viewpoint of securing the number of cure sites, improving heat resistance and compression set of a crosslinked molded article. In addition, the number of moles of cure sites per unit mass of the whole perfluoroelastomer is preferably not more than $1.0 \times 10^{-3}$ mole/g, more preferably not more than $5.0 \times 10^{-4}$ mole/g, further preferably not more than $1.0 \times 10^{-4}$ mole/g, from the viewpoint of inhibiting lowering of elongation due to increase in crosslinking density.

For introducing at least one cure site selected from the group consisting of a nitrile group, a carboxyl group and an alkoxycarbonyl group to the perfluoroelastomer to be used in the present invention, there can be employed a method of introducing by adding and copolymerizing a monomer having cure site when preparing the perfluoroelastomer (copolymerization method), and a method of subjecting a polymerization product to post-treatment (for example, acid treatment) to convert groups existing in the polymerization product such as metallic salts and ammonium salts of carboxylic acid to carboxyl groups (post-conversion method).

Examples of the monomer providing the cure site unit (c) and used for the copolymerization method are, for instance, compounds represented by the formula (1):

$$CF_2=CFO(CF_2CF(CF_3)O)_m(CF_2)_n-X^1 \quad (1)$$

wherein "m" is 0 or an integer of 1 to 5, "n" is an integer of 1 to 3, $X^1$ is a nitrile group, a carboxyl group or an alkoxycarbonyl group, and these compounds can be used alone or can be used in optional combination thereof.

Examples of the monomer providing the cure site unit (c) are compounds represented by the formulas (2) to (12):

$$CF_2=CF(CF_2)_n-X^2 \quad (2)$$

where "n" is an integer of 1 to 8, $$CF_2=CFCF_2R_f^2-X^2 \quad (3)$$

where $R_f^2$ is —$(OCF_2)_n$— or —$(OCF(CF_3))_n$—, n is an integer of 1 to 5, $$CF_2=CF(OCF_2CF(CF_3))_mO(CF_2)_n-X^2 \quad (4)$$

where "m" is 0 or an integer of 1 to 5, "n" is an integer of 1 to 8, $$CF_2=CF(OCF_2CF(CF_3))_m-X^2 \quad (5)$$

where "m" is an integer of 1 to 5, $$CF_2=CFOCF_2(CF(CF_3)OCF_2)_nCF(-X^2)CF_3 \quad (6)$$

where "n" is an integer of 1 to 4, $$CF_2=CFO(CF_2)_nOCF(CF_3)-X^2 \quad (7)$$

where "n" is an integer of 2 to 5, $$CF_2=CF(OCF_2CF(CF_3))_nOCF_2CF(CF_3)-X^2 \quad (8)$$

where "n" is an integer of 1 to 2, $$CF_2=CFO(CF_2CF(CF_3)O)_m(CF_2)_n-X^2 \quad (9)$$

where "m" is 0 or an integer of 1 to 5, "n" is an integer of 1 to 3, $$CF_2=CFO(CF_2CF(CF_3)O)_mCF_2CF(CF_3)-X^2 \quad (10)$$

where "m" is an integer of not less than 0, $$CF_2=CFOCF(CF_3)CF_2O(CF_2)_n-X^2 \quad (11)$$

where "n" is an integer of not less than 1, and $$CF_2=CFOCF_2OCF_2CF(CF_3)OCF_2-X^2 \quad (12),$$

and in the formulas (2) to (12), $X^2$ is a nitrile group (—CN group), a carboxyl group (—COOH group) or an alkoxycarbonyl group (—$COOR^5$ group, where $R^5$ is an alkyl group which has 1 to 10 carbon atoms and may have fluorine atom. Among these, perfluoro compounds having no hydrogen atom are preferred from the viewpoint of satisfactory heat resistance of the obtained perfluoroelastomer and in order to inhibit decrease in a molecular weight due to chain transfer when synthesizing the perfluoroelastomer by polymerization reaction. In addition, from the viewpoint of satisfactory polymerization reactivity with tetrafluoroethylene, compounds having a $CF_2=CFO$— structure are preferred.

In the present invention, the perfluoroelastomer can be prepared by radical polymerization methods such as an emulsion polymerization method, a suspension polymerization method and a solution polymerization method, and from the viewpoint of easy handling, an emulsion polymerization method is preferred.

Examples of a radical polymerization initiator are those which have been used for fluorine-containing rubbers. For example, there are organic and inorganic peroxides and azo compounds. Represented examples of the initiator are persulfates, percarbonates and peresters, and a preferred initiator is ammonium persulfate (APS). APS may be used alone and can be used in combination with a reducing agent such as sulfites.

The emulsifier used for emulsion polymerization can be selected from a wide range, and from the viewpoint of inhibiting a chain transfer reaction to the emulsifier molecules which occurs during polymerization, salts of carboxylic acids having a fluorocarbon chain or a fluoropolyether chain are desirable. The amount of emulsifier is preferably 0.05 to 20% by mass, especially preferably 0.2 to 15% by mass based on the added water.

The polymerization pressure can be changed within a wide range, and is generally within a range from 0.05 to 7 MPa. The higher the polymerization pressure is, the more a polymerization speed is increased. Accordingly, from the viewpoint of improvement in productivity, the polymerization pressure is preferably not less than 0.1 MPa.

Example of proper acid treatment in the case of introducing cure site by the post-conversion method is a method of washing the perfluoroelastomer obtained by radical polymerization, for example, with hydrochloric acid, sulfuric acid or nitric acid or a method of decreasing pH of a mixture system after the polymerization reaction to 3 or less by using such acids.

Also, carboxyl group can be introduced by subjecting a crosslinkable perfluoroelastomer having iodine or bromine to oxidation by using fuming nitric acid.

The glass transition temperature of the perfluoroelastomer is preferably not less than −70° C., more preferably not less than −60° C., further preferably not less than −50° C., from the viewpoint of satisfactory compression set at high temperature. In addition, the glass transition temperature of the perfluoroelastomer is preferably not more than −10° C., more preferably not more than −11° C., further preferably not more than −13° C., from the viewpoint of satisfactory cold resistance.

The Mooney viscosity $ML_{(1+20)}$ at 121° C. of the perfluoroelastomer is preferably not less than 50, more preferably not less than 60, further preferably not less than 70, from the viewpoint of satisfactory heat resistance. In addition, the Mooney viscosity $ML_{(1+20)}$ at 121° C. of the perfluoroelastomer is preferably not more than 180, more preferably not more than 150, further preferably not more than 110, from the viewpoint of satisfactory processability.

The Mooney viscosity $ML_{(1+20)}$ at 140° C. of the perfluoroelastomer is preferably not less than 30, more preferably not less than 40, further preferably not less than 50, from the viewpoint of satisfactory heat resistance. In addition, the Mooney viscosity $ML_{(1+20)}$ at 140° C. of the perfluoroelastomer is preferably not more than 180, more preferably not more than 150, further preferably not more than 110, from the viewpoint of satisfactory processability.

The higher the temperature of the perfluoroelastomer measured with a thermogravimetric/differential thermal analyzer (TG/DTA) at 20% mass reduction is, the more preferable from the viewpoint of satisfactory heat resistance. From this point of view, the temperature is preferably not less than 430° C., more preferably not less than 440° C., further preferably not less than 445° C.

The higher the temperature of the perfluoroelastomer measured with TG/DTA at 50% mass reduction is, the more preferable from the viewpoint of satisfactory heat resistance. From this point of view, the temperature is preferably not less than 450° C., more preferably not less than 460° C., further preferably not less than 465° C.

It is preferable that the perfluoroelastomer used for the perfluoroelastomer composition of the present invention has carboxyl group and satisfies the following equation (1) in that the carboxyl group acts as a cure site to improve heat resistance and compression set. It is more preferable that the perfluoroelastomer satisfies the following equation (2).

$$(S_{CO}/S_{CF}) \geq 0.01 \quad (1)$$

$$0.015 \leq (S_{CO}/S_{CF}) \leq 0.15 \quad (2)$$

$S_{CO}$: Total area of absorbances at the absorptions derived from carbonyl group of associated and non-associated carboxyl groups having the absorption peaks at from 1,700 to 1,830 $cm^{-1}$ when measurement is made with FT-IR with respect to the elastomer to be measured.

$S_{CF}$: Area of absorbance at absorption derived from a harmonic sound of C—F bond having an absorption peak at from 2,213 to 2,686 $cm^{-1}$ when measurement is made with FT-IR with respect to the elastomer to be measured. In the case where nitrile group is present, $S_{CF}$ is a value obtained by subtracting an area of absorbance at absorption derived from nitrile group having an absorption peak at from 2,248 to 2,282 $cm^{-1}$ from a total area of absorbance at whole absorption having a peak at from 2,213 to 2,686 $cm^{-1}$.

It is preferable that the perfluoroelastomer composition of the present invention comprises a crosslinking agent crosslinkable with the cure site of the perfluoroelastomer being capable of acting as a crosslinking point, or a catalyst functioning to bond cure sites being capable of acting as a crosslinking point by reaction, thereby generating a crosslinked structure.

The preferred crosslinking agent used in the present invention is the compound having at least two crosslinkable reaction groups represented by the formula (II):

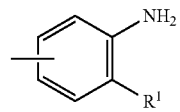

wherein $R^1$s are the same or different and each is any one of —$NH_2$, —$NHR^2$ ($R^2$ is a fluorine atom or a monovalent organic group, and when two or more —$NHR^2$ are contained, $R^2$s may be the same or different), —OH or —SH, in that the molecular structure after the crosslinking is stabilized by the aromatic ring, thus improving heat resistance.

Further, the crosslinking agent is preferably the compound represented by the formula (III):

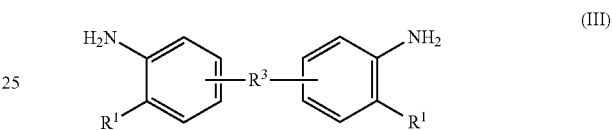

wherein $R^1$ is as defined in the above-mentioned formula (II); $R^3$ is —$SO_2$—, —O—, —CO—, an alkylene group having 1 to 6 carbon atoms, a perfluoroalkylene group having 1 to 10 carbon atoms, a single bond or a group represented by:

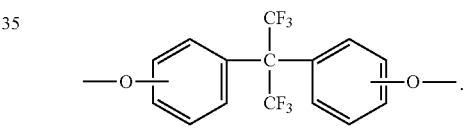

From the viewpoint of heat resistance, $R^1$ is preferably —$NH_2$ or —$NHR^2$, further preferably —$NHR^2$.

In the —$NHR^2$, $R^2$ is preferably a phenyl group which may be substituted or a benzyl group which may be substituted or an aliphatic hydrocarbon group which may be substituted such as an alkyl group having 1 to 9 carbon atoms or an alkyl group having 1 to 10 carbon atoms and fluorine atoms, and from the viewpoint of satisfactory heat resistance, a phenyl group which may be substituted is more preferred.

$R^3$ is preferably a perfluoroalkylene group having 1 to 10 carbon atoms.

Non-limiting examples of the crosslinking agent are 2,2-bis(3,4-diaminophenyl) hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino) phenyl]hexafluoropropane, 2,2-bis[3-amino-4-(N-benzylamino)phenyl]hexafluoropropane, and the like.

Among these, 2,2-bis[3-amino-4-(N-methylamino)phenyl]hexafluoropropane, 2,2-bis[3-amino-4-(N-ethylamino) phenyl]hexafluoropropane, 2,2-bis[3-amino-4-(N-propylamino)phenyl]hexafluoropropane and 2,2-bis[3-amino-4-(N-phenylamino)phenyl]hexafluoropropane are preferred from the viewpoint of satisfactory heat resistance, and 2,2- bis[3-amino-4-(N-phenylamino)phenyl]hexafluoropropane is preferred from the viewpoint of especially satisfactory heat resistance.

The content of crosslinking agent is preferably not less than 0.2 part by mass, more preferably not less than 0.3 part by mass, further preferably not less than 0.5 part by mass based on 100 parts by mass of the elastomer, from the viewpoint of sufficiently crosslinking the composition. In addition, the content of crosslinking agent is preferably not more than 10.0 parts by mass, more preferably not more than 2.0 parts by mass, further preferably not more than 1.5 parts by mass based on 100 parts by mass of the elastomer.

In the present invention, other crosslinking agent can be used together with the above-mentioned crosslinking agent.

In the case where the cure site being capable of acting as a crosslinking point is a nitrile group, a crosslinking catalyst preferably usable in the present invention is a catalyst acting to generate a triazine ring by reaction of three nitrile groups.

Preferred examples of a catalyst acting to generate a triazine ring are organic or inorganic tin compounds; organic or inorganic ammonium salts described in JP9-111081A, ammonia; ammonia-adsorbed carrier; and compounds generating ammonia by thermal decomposition as described in JP2007-502890A, and examples of compounds generating ammonia by thermal decomposition are urea and thiourea.

Among crosslinking catalysts, examples of organotin compounds are tetraphenyltin and triphenyltin, and the amount thereof is preferably 0.05 to 10 parts by mass, more preferably 1 to 5 parts by mass based on 100 parts by mass of the perfluoroelastomer. When the amount of organotin compound is less than 0.05 part by mass, there is a tendency that the perfluoroelastomer is not sufficiently crosslinked, and when the amount of organotin compound exceeds 10 parts by mass, physical properties of a crosslinked molded article tends to be lowered.

To the perfluoroelastomer composition of the present invention can be blended usual additives to be added, as case demands, to crosslinkable elastomer compositions, for example, a filler, a processing aid, a plasticizer and a colorant. In addition, at least one kind of crosslinking accelerator may be blended to the composition. Also, other kind of elastomer may be mixed to the composition to an extent not to impair the effect of the present invention.

Preferred examples of a filler are organic pigments; and organic fillers, for example, imide fillers having an imide structure such as polyimide, polyamide imide and polyether imide; ketone type engineering plastic fillers such as polyether ether ketone (PEEK) and polyether ketone (PEK), from the viewpoint of satisfactory heat resistance and plasma resistance (property of generating less particles, low mass reduction ratio), and especially organic pigments are preferred.

Examples of an organic pigment are condensed azo pigments, isoindolenone pigments, quinacridone pigments, diketopyrrolopyrrole pigments and anthraquinone pigments. Among these, from the viewpoint of excellent heat resistance and chemical resistance and less effect on characteristics of a crosslinked molded article, quinacridone pigments, diketopyrrolopyrrole pigments and anthraquinone pigments are preferred, and quinacridone pigments are more preferred.

Further, the perfluoroelastomer composition of the present invention may contain a general filler alone or may contain a general filler in addition to the above-mentioned organic pigment.

Examples of general fillers are engineering plastic type organic fillers such as polyarylate, polysulfone, polyether sulfone, polyphenylene sulfide, polyoxybenzoate and polytetrafluoroethylene powder; metallic oxide fillers such as aluminum oxide, silicon oxide, yttrium oxide and titanium oxide; metallic carbide fillers such as silicon carbide and aluminum carbide and metallic nitride fillers such as silicon nitride and aluminum nitride; and inorganic fillers such as aluminum fluoride, carbon fluoride, barium sulfate, carbon black, silica, clay and talc.

Among these, from the viewpoint of a satisfactory effect of shielding from various plasmas, aluminum oxide, yttrium oxide, silicon oxide, polyimide and carbon fluoride are preferred.

The above-mentioned inorganic fillers and organic fillers may be used alone or may be used in combination of two or more thereof.

The perfluoroelastomer composition of the present invention can be prepared by mixing each of the above-mentioned components by using usual processing equipment for rubber, for example, an open roll, a Banbury mixer, a kneader, or the like. In addition, the composition can be prepared also by a method of using a closed mixer or a method of emulsion mixing and then co-coagulation.

Shore A hardness of a crosslinked molded article obtained by crosslinking the perfluoroelastomer composition of the present invention is preferably not less than 50, more preferably not less than 55, further preferably not less than 60, from the viewpoint of satisfactory sealing property, for example, when using as a sealing material. Also, the hardness is preferably not more than 95, more preferably not more than 90, further preferably not more than 85, from the viewpoint of satisfactory sealing property.

The crosslinked molded article obtained by crosslinking the perfluoroelastomer composition of the present invention is suitable, for example, as sealing materials used in the fields of aviation and space industries, semiconductor manufacturing equipment and chemical plant because of excellent chemical resistance, mechanical strength, heat resistance and plasma resistance thereof. Examples of a sealing material are O-ring, square ring, gasket, packing, oil seal, bearing seal and lip seal.

In the present invention, the semiconductor manufacturing equipment is not limited particularly to equipment for manufacturing semiconductors and encompasses whole manufacturing equipment used in the field of manufacturing products required to have sealing property in vacuo, plasma resistance and heat resistance, such as equipment for manufacturing a liquid crystal panel and plasma panel. Examples thereof are as follows.

(1) Etching System
  Dry etching equipment
  Plasma etching machine
  Reactive ion etching machine
  Reactive ion beam etching machine
  Sputter etching machine
  Ion beam etching machine
  Wet etching equipment
  Ashing equipment
(2) Cleaning System
  Dry etching cleaning equipment
  UV/$O_3$ cleaning machine
  Ion beam cleaning machine
  Laser beam cleaning machine
  Plasma cleaning machine
  Gas etching cleaning machine
  Extractive cleaning equipment
  Soxhlet extractive cleaning machine
  High temperature high pressure extractive cleaning machine
  Microwave extractive cleaning machine Supercritical extractive cleaning machine
(3) Exposing System
  Stepper
  Coater and developer
(4) Polishing System
  CMP equipment
(5) Film Forming System
  CVD equipment
  Sputtering equipment
(6) Diffusion and Ion Implantation System
  Oxidation and diffusion equipment
  Ion implantation equipment

EXAMPLE

The present invention is then explained by means of examples, but is not limited to them.
Measuring methods employed in the present invention are as follows.
(1) Identification of Component Units of an Elastomer
  Component units are identified according to melt-NMR ($^{19}F$) analysis and FT-IR analysis. The results of analysis of a perfluoroelastomer comprising TFE, perfluoro(methyl vinyl ether) and $CF_2=CFOCF_2CF(CF_3)OCF_2CF_2CN$ (69.25/30.3/0.45 in molar percent) are used as a standard.
(1-1) Melt-NMR ($^{19}F$) Analysis
Equipment: AVANCE 300 available from BRUKER
Conditions: To be measured by melting at 270° C.
(1-2) FT-IR Analysis
Equipment: FT-IR spectrometer Model 1760X available from Perkin Elmer Co., Ltd.
Conditions: Targeted perfluoroelastomer is formed into a thin film and measurement is made by a transmission method.
(2) Glass Transition Temperature (Tg)
  Measurement is carried out with a differential scanning calorimeter DSC822$^e$ available from METTLER TOLEDO by differential scanning calorimetry (DSC). Temperature is elevated at a rate of 20° C./min from −80° C. to 100° C. in a stream of N2 gas at 50 ml/min and measurement is carried out. Subsequently, temperature is decreased at a rate of −100° C./min from 100° C. to −80° C., followed by allowing to stand at −80° C. for 30 minutes, and thereafter, temperature is elevated again at a rate of 20° C./min from −80° C. to 100° C. and measurement is carried out.
(3) Mooney Viscosity
  Mooney viscosity is measured at 121° C. (at 140° C. in Preparation Examples 3, 5 and 7) in accordance with JIS K6300 by using a Mooney viscometer Model MV2000E available from ALPHA TECHNOLOGIES.
(4) Temperature at 20% and 50% Mass Reduction
  Change of mass is measured with a thermogravimeter (TG-DTA6200 available from Seiko Instruments, Inc.) under the conditions of 200 mL/min of air flow and 10° C./min of temperature elevation rate within a temperature range from 20° C. to 600° C., and temperatures at 20% and 50% mass reduction are measured.
(5) Concentration of Cure Site (mole/g)
  A concentration is determined by a composition calculated from results of Melt-NMR ($^{19}F$) analysis and FT-IR analysis.
(6) Physical Properties Under Normal Conditions
  100% modulus (M100), tensile strength at break (Tb) and elongation at break (Eb) of a 2 mm thick crosslinked molded sheet are measured under normal conditions in accordance with JIS K6251 by using No. 6 dumbbell.
(7) Hardness
  Hardness (Shore A) of a crosslinked molded article is measured in accordance with JIS K6253 (peak value).
(8) Specific Gravity
  A specific gravity of a crosslinked molded article is measured in accordance with JIS K6268.
(9) Compression Set
  Compression set of O-ring of P-24 standard (JIS B2401) prepared in accordance with JIS B2401 is measured by 25% compression at 310° C. for 504 hours.

Preparation Example 1

Synthesis of perfluoroelastomer "a"

<<Polymerization Step>>
Into a 3-liter stainless steel autoclave having no ignition source and equipped with FULLZONE impellers as a stirrer were poured 1,200 g of pure water, 120 g of $C_3F_7OCF(CF_3)$ $CF_2OCF(CF_3)COONH_4$ as an emulsifying agent, 3.918 g of NaCl and 2.112 g of $Na_2SO_3$, and the inside of a system was sufficiently replaced with nitrogen gas and deaeration was carried out. Then, the inside temperature was set at 15° C., and 360 g of $CF_2=CFO(CF_2CF(CF_3)O)_2CF_2CF_2CF_3$ (hereinafter referred to as N=2VE) and 6.48 g of $CF_2=CFOCF_2CF(CF_3)OCF_2CF_2CN$ (hereinafter referred to as CNVE) were introduced into a cylinder for feeding, and then were introduced into the autoclave with pressurized nitrogen gas after the inside of the cylinder was sufficiently replaced by nitrogen gas. Then, pressurized tetrafluoroethylene (hereinafter referred to as TFE) was introduced to increase the inside pressure to 0.049 MPa·G, and the number of rotations of the stirring impellers was set at 600 rpm. Then, TFE was further introduced so that the inside pressure became 0.20 MPa·G. Subsequently, a solution prepared by dissolving 0.080 g of ammonium persulfate (APS) in 3 g of pure water was introduced with pressurized nitrogen gas to initiate a reaction.
As the polymerization proceeded, when the inside pressure decreased to 0.19 MPa·G, TFE was introduced so that the inside pressure became 0.20 MPa·G. Thereafter, as the reaction proceeded, when the inside pressure decreased to 0.19 MPa·G, TFE was introduced in the same manner as above to increase the inside pressure to 0.20 MPa·G, and increasing and decreasing of the inside pressure were repeated between 0.19 MPa·G and 0.20 MPa·G.
Three hours after starting of the polymerization, a solution prepared by dissolving 0.080 g of APS in 3 g of pure water was again added with pressurized nitrogen gas. Also, four hours after starting of the polymerization, a solution prepared by dissolving 0.001452 g of copper sulfate pentahydrate ($CuSO_4.5H_2O$) in 3 g of pure water was introduced with pressurized nitrogen gas.
When the total amount of introduced TFE reached 155 g 4.6 hours after starting of the polymerization, unreacted monomers were discharged to obtain 1,766 g of an aqueous dispersion having a solid content of 24.1% by mass.
<<Post-Treatment Step>>
880 g of the obtained aqueous dispersion was slowly added to 8,800 g of 3.5% by mass aqueous solution of hydrochloric acid with stirring. The solution was stirred for five minutes after the addition, and then a coagulated product was filtered off. The obtained polymer was further poured into 1,000 g of $CH_3CCl_2F$ (HCFC-141b), followed by 5-minute stirring and filtering off again. Then, the washing with HCFC-141b and the filtering off were repeated five more times and the polymer was taken out. After treating 1,766 g of the aqueous dispersion obtained by the polymerization in the same manner as above, the whole of the obtained polymer was subjected to vacuum drying at 70° C. for 48 hours to obtain 426 g of a dried polymer (perfluoroelastomer "a").

As a result of melt-NMR ($^{19}$F) analysis and IR analysis, the amounts of component units of this polymer (TFE/N=2VE/CNVE) were determined. The results are shown in Table 1.

The Mooney viscosity (ML$_{(1+20)}$ 121° C.) of this polymer was 70. Also, the glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Preparation Example 2

Synthesis of Perfluoroelastomer "b"

Polymerization was carried out under the same polymerization conditions as in Preparation Example 1 except that the amount of CNVE was changed to 12.98 g, a solution of ammonium persulfate (APS) (0.080 g of APS in 3 g of pure water) was introduced only once when starting the polymerization, and 0.001452 g of copper sulfate pentahydrate (CuSO$_4$.5H$_2$O) was introduced 3.4 hours after starting of the polymerization.

Polymerization time was 5.9 hours, and 1,807 g of an aqueous dispersion having a solid content of 23.0% by mass was obtained.

The obtained aqueous dispersion was subjected to the post-treatment in the same manner as in Preparation Example 1 to obtain 413 g of a dried polymer (perfluoroelastomer "b").

As a result of melt-NMR ($^{19}$F) analysis and IR analysis, the amounts of component units of this polymer (TFE/N=2VE/CNVE) were determined. The results are shown in Table 1.

The Mooney viscosity (ML$_{(1+20)}$ 121° C.) of this polymer was 77. Also, the glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Preparation Example 3

Synthesis of Perfluoroelastomer "c"

Polymerization was carried out under the same polymerization conditions as in Preparation Example 2 except that the polymerization pressure was 0.29 to 0.30 MPa·G, and introduction of copper sulfate pentahydrate (CuSO$_4$.5H$_2$O) was carried out 2.4 hours after starting of the polymerization.

Polymerization time was 3.7 hours, and 1,784 g of an aqueous dispersion having a solid content of 19.4% by mass was obtained.

The obtained aqueous dispersion was subjected to the post-treatment in the same manner as in Preparation Example 1 to obtain 343 g of a dried polymer (perfluoroelastomer "c").

As a result of melt-NMR ($^{19}$F) analysis and IR analysis, the amounts of component units of this polymer (TFE/N=2VE/CNVE) were determined. The results are shown in Table 1.

Since this polymer was not sufficiently molten at 121° C., the Mooney viscosity (ML$_{(1+20)}$ 121° C.) thereof could not be measured, and the Mooney viscosity (ML$_{(1+20)}$ 140° C.) thereof was 92. The glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Preparation Example 4

Synthesis of Perfluoroelastomer "d"

Polymerization was carried out under the same polymerization conditions as in Preparation Example 2 except that a solution of APS (0.080 g of APS in 3 g of pure water) was introduced when starting the polymerization, three hours after starting of the polymerization and six hours after starting of the polymerization, and introduction of 0.001452 g of copper sulfate pentahydrate (CuSO$_4$.5H$_2$O) was carried out 1.3 hours after starting of the polymerization.

When the total amount of introduced TFE reached 145 g 9.8 hours after starting of the polymerization, unreacted monomers were discharged to obtain 1,691 g of an aqueous dispersion having a solid content of 21.0% by mass.

The obtained aqueous dispersion was subjected to the post-treatment in the same manner as in Preparation Example 1 to obtain 353 g of a dried polymer (perfluoroelastomer "d").

As a result of melt-NMR ($^{19}$F) analysis and IR analysis, the amounts of component units of this polymer (TFE/N=2VE/CNVE) were determined. The results are shown in Table 1.

The Mooney viscosity (ML$_{(1+20)}$ 121° C.) of this polymer was 86. The glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Preparation Example 5

Synthesis of Perfluoroelastomer "e"

Polymerization was carried out under the same polymerization conditions as in Preparation Example 2 except that the amount of CNVE was changed to 19.44 g, a solution of APS (0.080 g of APS in 3 g of pure water) was introduced when starting the polymerization, a solution of APS (0.024 g of APS in 3 g of pure water) was introduced 5.2 hours after starting of the polymerization, 0.001452 g of copper sulfate pentahydrate (CuSO$_4$.5H$_2$O) was introduced 2.1 hours after starting of the polymerization and 0.0007262 g of copper sulfate pentahydrate (CuSO$_4$.5H$_2$O) was introduced 5.7 hours after starting of the polymerization.

Polymerization time was 7.3 hours, and 1,788 g of an aqueous dispersion having a solid content of 21.8% by mass was obtained.

The obtained aqueous dispersion was subjected to the post-treatment in the same manner as in Preparation Example 1 to obtain 386 g of a dried polymer (perfluoroelastomer "e").

As a result of melt-NMR ($^{19}$F) analysis and IR analysis, the amounts of component units of this polymer (TFE/N=2VE/CNVE) were determined. The results are shown in Table 1.

Since this polymer was not sufficiently molten at 121° C., the Mooney viscosity (ML$_{(1+20)}$ 121° C.) thereof could not be measured, and the Mooney viscosity (ML$_{(1+20)}$ 140° C.) thereof was 75. The glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Preparation Example 6

Synthesis of Perfluoroelastomer "f"

Polymerization was carried out under the same polymerization conditions as in Preparation Example 2 except that a solution of APS (0.080 g of APS in 3 g of pure water) was introduced every two hours (6 times) after starting of the polymerization, 0.00029 g each of copper sulfate pentahydrate (CuSO$_4$·5H$_2$O) was introduced when starting the polymerization, 3.0 hours after starting of the polymerization, 4.7 hours after starting of the polymerization and 8.6 hours after starting of the polymerization, and 0.00058 g each of copper sulfate pentahydrate was introduced 6.4 hours after starting of the polymerization and 10.1 hours after starting of the polymerization.

Polymerization time was 11.1 hours, and 1,786 g of an aqueous dispersion having a solid content of 22.9% by mass was obtained.

The obtained aqueous dispersion was subjected to the post-treatment in the same manner as in Preparation Example 1 to obtain 379 g of a dried polymer (perfluoroelastomer "f").

As a result of melt-NMR ($^{19}$F) analysis and IR analysis, the amounts of component units of this polymer (TFE/N=2VE/CNVE) were determined. The results are shown in Table 1.

The Mooney viscosity (ML$_{(1+20)}$ 121° C.) of this polymer was 91. The glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Preparation Example 7

Synthesis of Perfluoroelastomer "g"

Polymerization was carried out under the same polymerization conditions as in Preparation Example 2 except that the polymerization pressure was 0.24 to 0.25 MPa·G, 0.0083 g each of a solution of APS (0.080 g of APS in 3 g of pure water) was introduced (5 times) when starting the polymerization, 1.9 hours after starting of the polymerization, 4.2 hours after starting of the polymerization, 4.9 hours after starting of the polymerization and 8.0 hours after starting of the polymerization, and 0.00029 g each of copper sulfate pentahydrate (CuSO$_4$·5H$_2$O) was introduced when starting the polymerization, 3.7 hours after starting of the polymerization, 6.2 hours after starting of the polymerization and 8.2 hours after starting of the polymerization.

Polymerization time was 10.0 hours, and 1,797 g of an aqueous dispersion having a solid content of 21.4% by mass was obtained.

The obtained aqueous dispersion was subjected to the post-treatment in the same manner as in Preparation Example 1 to obtain 358 g of a dried polymer (perfluoroelastomer "g").

As a result of melt-NMR ($^{19}$F) analysis and IR analysis, the amounts of component units of this polymer (TFE/N=2VE/CNVE) were determined. The results are shown in Table 1.

Since this polymer was not sufficiently molten at 121° C., the Mooney viscosity (ML$_{(1+20)}$ 121° C.) thereof could not be measured, and the Mooney viscosity (ML$_{(1+20)}$ 140° C.) thereof was 80. The glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

Comparative Preparation Example

Synthesis of Perfluoroelastomer (TFE/PMVE/CNVE)

Into a 6-liter stainless steel autoclave having no ignition source and equipped with MAXBLEND impellers as a stirrer were poured 2.338 liter of pure water, and 23.4 g of C$_3$F$_7$OCF(CF$_3$)CF$_2$OCF(CF$_3$)COONH$_4$ and 0.21 g of (NH$_4$)$_2$CO$_3$ as emulsifying agents, and the inside of a system was sufficiently replaced with nitrogen gas and deaeration was carried out. Then, the mixture was heated up to 52° C. with stirring at 600 rpm, and a gas mixture of tetrafluoroethylene (TFE) and perfluoro(methyl vinyl ether) (PMVE) (molar ratio of TFE/PMVE=35/65) was introduced so that the inside pressure became 0.78 MPa·G. Then, after introducing 0.85 g of CNVE with pressurized nitrogen gas, a solution prepared by dissolving 12.3 g of APS in 30 g of pure water was introduced with pressurized nitrogen gas to initiate a reaction.

As the polymerization proceeded, when the inside pressure decreased to 0.73 MPa·G, pressurized TFE and PMVE in a mole percent ratio of 70/30 was introduced so that the inside pressure became 0.83 MPa·G. Thereafter, as the reaction proceeded, pressurized TFE and PMVE were introduced, and increasing and decreasing of the inside pressure were repeated between 0.73 MPa·G and 0.83 MPa·G. Thus, 400 g of TFE and 284 g of PMVE were introduced. During the polymerization, CNVE totaling 14.45 g was additionally added in 17 lots. After completion of the polymerization, the autoclave was cooled, and unreacted monomers were discharged to obtain 2,991.2 g of an aqueous dispersion having a solid content of 22.3% by mass. The polymerization time was 6.2 hours.

1,000 g of this aqueous dispersion was diluted with 1,000 g of pure water, and slowly added to 5,000 g of 3.5% by mass aqueous solution of hydrochloric acid with stirring. The solution was stirred for five minutes after the addition, and then a coagulated product was filtered off. The obtained polymer was further poured into 5,000 g of pure water, followed by 5-minute stirring and filtering off again. Then, the washing with water and the filtering off were repeated and when pH of the washing water after the washing reached 6 or more, the polymer was taken out. After treating 2,991 g of the aqueous dispersion obtained by the polymerization in the same manner as above, the whole of the obtained polymer was subjected to vacuum drying at 70° C. for 48 hours to obtain 615 g of a dried polymer.

As a result of melt-NMR ($^{19}$F) analysis and IR analysis, the amounts of component units of this polymer (TFE/PMVE/CNVE) were determined. The results are shown in Table 1.

The glass transition temperature (Tg), temperature at 20% mass reduction, temperature at 50% mass reduction, S$_{CO}$/S$_{CF}$ by FT-IR and concentration of cure site (mole/g) of this polymer were determined. The results are shown in Table 1.

TABLE 1

|  | Preparation Example | | | | | | | Com. |
| --- | --- | --- | --- | --- | --- | --- | --- | --- |
|  | 1 | 2 | 3 | 4 | 5 | 6 | 7 | Prep. Ex. |
| Component units Perfluoroelastomer | | | | | | | | |
| TFE (mole %) | 78.56 | 78.83 | 82.03 | 78.91 | 79.76 | 79.38 | 81.62 | 69.0 |
| CNVE (mole %) | 0.58 | 1.23 | 1.03 | 1.21 | 1.81 | 1.17 | 1.04 | 0.5 |
| N = 2VE (mole %) | 20.86 | 19.94 | 16.94 | 19.88 | 18.43 | 19.45 | 17.34 |  |
| PMVE (mole %) |  |  |  |  |  |  |  | 30.5 |

TABLE 1-continued

| | Preparation Example | | | | | | | Com. Prep. Ex. |
|---|---|---|---|---|---|---|---|---|
| | 1 | 2 | 3 | 4 | 5 | 6 | 7 | |
| Evaluation | | | | | | | | |
| $S_{CO}/S_{CF}$ | 0.073 | 0.064 | 0.061 | 0.062 | 0.059 | 0.059 | 0.057 | 0.026 |
| Tg (° C.) | −18.5 | −18.6 | −15.4 | −18.6 | −17.0 | −17.1 | −16.1 | 5.0 |
| Mooney viscosity $ML_{(1+20)}$ | 70 (121° C.) | 77 (121° C.) | 92 (140° C.) | 86 (121° C.) | 75 (140° C.) | 91 (121° C.) | 80 (140° C.) | not melted |
| Temperature at 20% mass reduction (° C.) | 450.2 | 453.2 | 458.2 | 452.5 | 450.7 | 450.9 | 455.5 | 460 |
| Temperature at 50% mass reduction (° C.) | 471 | 473.6 | 482.7 | 472.4 | 471.5 | 472 | 479.8 | 473.1 |
| Concentration of cure site (×10⁻⁵ mole/g) | 2.8 | 6.1 | 5.5 | 6.0 | 9.2 | 5.9 | 5.5 | 3.7 |

Example 1

A crosslinkable perfluoroelastomer composition was prepared by kneading the perfluoroelastomer "a" prepared in Preparation Example 1, a crosslinking agent represented by the formula:

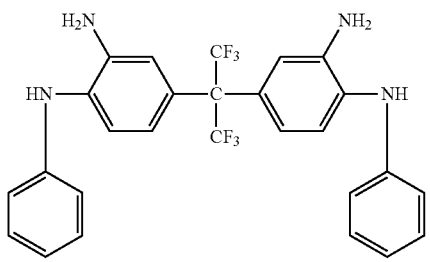

(AFTA-Ph synthesized by the method mentioned in Journal of Polymer Science, Polymer Chemistry, Vol. 20, pp. 2,381 to 2,393 (1982)) and carbon black (Thermax N990 available from Cancarb Co., Ltd.) in a mixing ratio of 100/0.51/20 (mass ratio) with an open roll.

This perfluoroelastomer composition was subjected to press-crosslinking at 180° C. for 2 hours and further heating at 290° C. for 18 hours in an oven to prepare a crosslinked molded article which was then formed into a 2 mm thick sheet and an O-ring of P-24 standard (JIS B 2401). Evaluation of this crosslinked molded article (physical properties under normal conditions and compression set) was carried out. The results of the evaluation are shown in Table 2.

Examples 2 to 7 and Comparative Example 1

Crosslinked molded articles were prepared in the same manner as in Example 1 except that the perfluoroelastomers prepared in Preparation Examples 2 to 7 and Comparative Preparation Example, AFTA-Ph and carbon black (Thermax N990 available from Cancarb Co., Ltd.) were blended in the amounts shown in Table 2, and physical properties thereof were measured. The results are shown in Table 2.

TABLE 2

| | Example | | | | | | | Com. Ex. |
|---|---|---|---|---|---|---|---|---|
| | 1 | 2 | 3 | 4 | 5 | 6 | 7 | 1 |
| Blending amount | | | | | | | | |
| Perfluoroelastomer | Prep. Ex. 1 | Prep. Ex. 2 | Prep. Ex. 3 | Prep. Ex. 4 | Prep. Ex. 5 | Prep. Ex. 6 | Prep. Ex. 7 | Com. Prep. Ex. |
| (part by mass) | 100 | 100 | 100 | 100 | 100 | 100 | 100 | 100 |
| Crosslinking agent (part by mass) | 0.51 | 0.95 | 0.98 | 1.09 | 1.66 | 1 | 1 | 0.9 |
| Carbon black (part by mass) | 20 | 20 | 20 | 20 | 20 | 20 | 20 | 20 |
| Evaluation | | | | | | | | |
| Physical properties under normal conditions | | | | | | | | |
| M100 (MPa) | 4.8 | 6.2 | — | 5.1 | 11.5 | 6.5 | — | 11.7 |
| $T_b$ (MPa) | 12.9 | 14.5 | 12.8 | 14.8 | 14.3 | 15.5 | 13.5 | 25.3 |
| Eb (%) | 261 | 201 | 94 | 238 | 112 | 217 | 91 | 200 |
| Hs (Shore A) | 65 | 67 | 78 | 67 | 73 | 68 | 76 | 83 |
| Specific gravity | 1.97 | 1.97 | 1.97 | 1.96 | 1.96 | 1.96 | 1.97 | 2.02 |
| Compression set (%) | 93.5 | 60.3 | 42.6 | 55.5 | 44.4 | 49.6 | 42.8 | 67.1 |

Preparation Example 8

Synthesis of Perfluoroelastomer "h"

Polymerization was carried out under the same polymerization conditions as in Preparation Example 2 except that 269.4 g of $CF_2=CFO(CF_2CF_2O)_2CF_2CF_3$ was added instead of N=2VE, a solution of APS (0.0083 g of APS in 3 g of pure water) was introduced every one hour (8 times) after starting of the polymerization, and 0.00029 g each of copper sulfate pentahydrate ($CuSO_4.5H_2O$) was introduced every one hour (8 times) after starting of the polymerization.

Polymerization time was 7.6 hours, and 1,973 g of an aqueous dispersion having a solid content of 15.6% by mass was obtained.

The obtained aqueous dispersion was subjected to the post-treatment in the same manner as in Preparation Example 1 to obtain 308 g of a dried polymer (perfluoroelastomer "h").

As a result of melt-NMR ($^{19}F$) analysis, this polymer was $TFE/CF_2=CFO(CF_2CF_2O)_2CF_2CF_3/CNVE$ (=78.4/20.4/1.2 in molar percent).

The glass transition temperature (Tg) of this polymer was −30.9° C., $S_{CO}/S_{CF}$ by FT-IR was 0.0385 and the concentration of cure site was $6.88 \times 10^{-5}$ mole/g.

Example 8

100 parts by mass of the perfluoroelastomer "h" obtained in Preparation Example 8 and 1.0 part by mass of AFTA-Ph were mixed and a crosslinked molded article was prepared in the same manner as in Example 1.

INDUSTRIAL APPLICABILITY

The present invention can provide a perfluoroelastomer composition having a low glass transition temperature, low hardness, improved kneadability and processability, and excellent cold resistance and heat resistance by using a perfluoroelastomer comprising a specific perfluoro vinyl ether unit (b) in a specific amount.

The invention claimed is:

1. A perfluoroelastomer composition comprising a perfluoroelastomer comprising:
   (a) a tetrafluoroethylene unit,
   (b) a perfluoro vinyl ether unit represented by the formula (I):

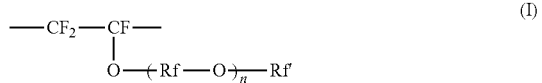

wherein Rf is a linear or branched perfluoroalkylene group having 1 to 6 carbon atoms; "n" is an integer of 2 to 20, and when "n" is 2 or more, Rfs in "n" (RfO) units may be the same or different; Rf' is a linear or branched perfluoroalkyl group having 1 to 6 carbon atoms, and
   (c) a cure site unit having a nitrile group, a carboxyl group and/or an alkoxycarbonyl group as a cure site,
   said perfluoro vinyl ether unit (b) being contained in an amount of 13 to 23% by mole in the perfluoroelastomer,
   wherein a glass transition temperature of the perfluoroelastomer is −70° C. to −10° C., and
   wherein a temperature of the perfluoroelastomer measured with a thermogravimetric/differential thermal analyzer at 20% mass reduction is not less than 445° C.

2. The perfluoroelastomer composition of claim 1, wherein the perfluoro vinyl ether unit (b) is a unit represented by the formula (bI):

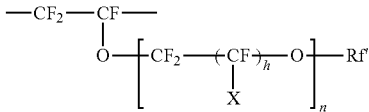

wherein X is fluorine atom or a trifluoromethyl group, and when X is fluorine atom, "h" is 0 or an integer of 1 to 5, and when X is a trifluoromethyl group, "h" is 0 or an integer of 1 to 2; "n" is an integer of 2 to 20, and when "n" is 2 or more, $(CF_2(CFX)_h)$ in "n" $(CF_2(CFX)_hO)$ units may be the same or different; Rf' is a linear or branched perfluoroalkyl group having 1 to 6 carbon atoms.

3. The perfluoroelastomer composition of claim 1, wherein a concentration of cure sites per unit mass of the whole perfluoroelastomer is $1.0 \times 10^{-6}$ to $1.0 \times 10^{-3}$ mole/g.

4. The perfluoroelastomer composition of claim 1, wherein a Mooney viscosity at 121° C. of the perfluoroelastomer is not less than 50.

5. The perfluoroelastomer composition of claim 1, wherein a temperature of the perfluoroelastomer measured with a thermogravimetric/differential thermal analyzer at 50% mass reduction is not less than 450° C.

6. The perfluoroelastomer composition of claim 1, wherein the perfluoroelastomer has carboxyl group and satisfies the following equation (1).

$$(S_{CO}/S_{CF}) \geq 0.01 \tag{1}$$

$S_{co}$: Total area of absorbances at the absorptions derived from carbonyl group of associated and non-associated carboxyl groups having the absorption peaks at from 1,700 to 1,830 $cm^{-1}$ when measurement is made with FT-IR with respect to the elastomer to be measured.

$S_{CF}$: Area of absorbance at absorption derived from a harmonic sound of C—F bond having an absorption peak at from 2,213 to 2,686 $cm^{-1}$ when measurement is made with FT-IR with respect to the elastomer to be measured. In the case where nitrile group is present, $S_{CF}$ is a value obtained by subtracting an area of absorbance at absorption derived from nitrile group having an absorption peak at from 2,248 to 2,282 $cm^{-1}$ from a total area of absorbance at whole absorption having a peak at from 2,213 to 2,686 $cm^{-1}$.

7. A perfluoroelastomer composition comprising the perfluoroelastomer composition of claim 1 and a crosslinking agent.

8. The perfluoroelastomer composition of claim 7, wherein the crosslinking agent is a compound having at least two crosslinkable reaction groups represented by the formula (II):

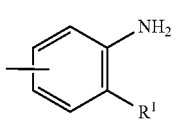

wherein $R^1$s are the same or different and each is any one of —$NH_2$, —$NHR^2$ ($R^2$ is a fluorine atom or a monovalent organic group, and when two or more —$NHR^2$ are contained, $R^2$s may be the same or different), —OH or —SH.

9. The perfluoroelastomer composition of claim 8, wherein the crosslinking agent is a compound represented by the formula (III):

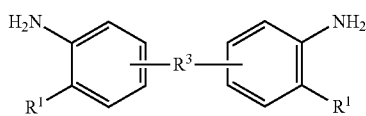 (III)

wherein $R^1$ is as defined in said formula (II); $R^3$ is —$SO_2$—, —O—, —CO—, an alkylene group having 1 to 6 carbon atoms, a perfluoroalkylene group having 1 to 10 carbon atoms, a single bond or a group represented by:

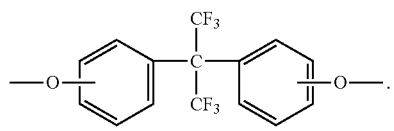

10. The perfluoroelastomer composition of claim 7, wherein the crosslinking agent is a compound having at least two crosslinkable reaction groups represented by the formula (IV):

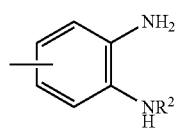 (IV)

wherein $R^2$s in two or more —$NHR^2$ may be the same or different and each is a fluorine atom or a monovalent organic group.

11. The perfluoroelastomer composition of claim 10, wherein the crosslinking agent is a compound represented by the formula (V):

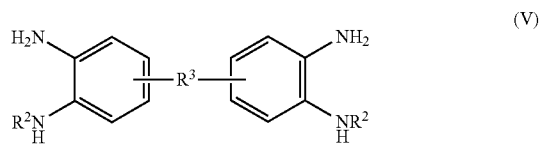 (V)

wherein $R^2$ is as defined in said formula (IV); $R^3$ is —$SO_2$—, —O—, —CO—, an alkylene group having 1 to 6 carbon atoms, a perfluoroalkylene group having 1 to 10 carbon atoms, a single bond or a group represented by:

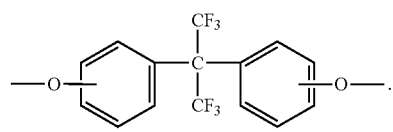

* * * * *